US012739854B2

(12) United States Patent
Li

(10) Patent No.: US 12,739,854 B2
(45) Date of Patent: Sep. 15, 2026

(54) METHOD AND DEVICE FOR DETERMINING APPLICATION TIME OF BEAM

(71) Applicant: Beijing Xiaomi Mobile Software Co., Ltd., Beijing (CN)

(72) Inventor: Mingju Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 331 days.

(21) Appl. No.: 18/573,047

(22) PCT Filed: Jun. 24, 2021

(86) PCT No.: PCT/CN2021/102182
§ 371 (c)(1),
(2) Date: Dec. 21, 2023

(87) PCT Pub. No.: WO2022/266957
PCT Pub. Date: Dec. 29, 2022

(65) Prior Publication Data
US 2024/0292429 A1 Aug. 29, 2024

(51) Int. Cl.
*H04W 4/00* (2018.01)
*H04W 72/044* (2023.01)
*H04W 72/232* (2023.01)

(52) U.S. Cl.
CPC ....... *H04W 72/232* (2023.01); *H04W 72/046* (2013.01)

(58) Field of Classification Search
CPC .......................... H04W 72/232; H04W 72/046
See application file for complete search history.

(56) References Cited

U.S. PATENT DOCUMENTS

2015/0180623 A1* 6/2015 Kim ........................ H04L 5/001 370/336
2019/0260456 A1* 8/2019 Zhou .................... H04B 7/0877
(Continued)

FOREIGN PATENT DOCUMENTS

CN 110431900 A 11/2019
JP 2019-57911 A 4/2019
(Continued)

OTHER PUBLICATIONS

"Further discussion on multi beam enhancement", vivo, 3GPP TSG RAN WG1 #105-e, R1-2104343, e-Meeting, May 10-27, 2021, 33 pages.
(Continued)

*Primary Examiner* — Abdelnabi O Musa
(74) *Attorney, Agent, or Firm* — Finnegan, Henderson, Farabow, Garrett & Dunner, L.L.P.

(57) ABSTRACT

A method for determining an application time of a beam is performed by a terminal device. The method includes: receiving downlink control information (DCI) based on a physical downlink control channel (PDCCH) of a first carrier, wherein the DCI is configured to indicate a beam corresponding to a designated resource on a second carrier; sending indication information, wherein the indication information is configured to indicate a receiving state of the DCI; and determining an application time of the beam corresponding to the designated resource according to a sending time point of the indication information.

16 Claims, 6 Drawing Sheets

(56) References Cited

U.S. PATENT DOCUMENTS

| | | | | |
|---|---|---|---|---|
| 2019/0306911 | A1* | 10/2019 | Hahn | H04W 72/0453 |
| 2021/0266942 | A1* | 8/2021 | Zhou | H04B 7/06968 |
| 2022/0190895 | A1* | 6/2022 | Zhang | H04B 7/0608 |
| 2022/0225338 | A1* | 7/2022 | Zhu | H04B 7/06968 |
| 2023/0403064 | A1* | 12/2023 | Yao | H04L 5/001 |
| 2024/0089070 | A1* | 3/2024 | Yang | H04L 5/0094 |
| 2024/0155637 | A1* | 5/2024 | Wang | H04W 72/232 |
| 2024/0188015 | A1* | 6/2024 | Comsa | H04B 7/022 |

FOREIGN PATENT DOCUMENTS

| | | |
|---|---|---|
| JP | 2020-521346 A | 7/2020 |
| WO | 2021088012 A1 | 5/2021 |

OTHER PUBLICATIONS

Extended European Search Report Issued in Application No. 21946453.4 dated Jul. 11, 2024, 11 pages.

Notice of Reasons for Refusal issued by the Japanese Patent Office on Nov. 6, 2024, in corresponding Application No. JP 2023-579247, 12 pages.

"Discussion on multi-beam operation", NTT Docomo, Inc., 3GPP TSG RAN WG1 #105, R1-2105683, e-Meeting, May 10-27, 2021, 19 pages.

International Search Report and Written Opinion of International Application No. PCT/CN2021/102182, dated Dec. 24, 2021, 19 pages.

Moderator (Samsung), "Moderator summary#2 for multi-beam enhancement: Round 1", 3GPP TSG RAN WG1 #104-e, R1-2101856, e-Meeting, Jan. 25-Feb. 5, 2021, 30 pages.

Ad-hoc chair (Samsung), "Session notes for 8.1 (Further enhancements on MIMO for NR)", 3GPP TSG RAN WG1 Meeting #105-e, R1-2106229, e-Meeting, May 10-27, 2021, 16 pages.

"Discussion on multi-beam operation", NTT Docomo, Inc., 3GPP TSG RAN WG1 #104, R1-2101597, e-Meeting, Jan. 25-Feb. 5, 2021, 20 pages.

Enhancements on Multi-beam Operation, Qualcomm Incorporated, 3GPP TSG RAN WG1 #104-bis-e, R1-2103150, Apr. 12-20, 2021, 15 pages.

"Enhancement on multi-beam operation", MediaTek, Inc. 3GPP TSG RAN WG1 #104-e, R1-2100588, e-Meeting, Jan. 25-Feb. 5, 2021, 27 pages.

Office Action issued by the Korean Patent Office on Feb. 6, 2026, in corresponding KR Application No. 10-2024-7002712, 13 pages.

Office Action issued by the Intellectual Property India on Apr. 8, 2026, in corresponding IN Application No. 202447004678, 6 pages.

* cited by examiner

METHOD AND DEVICE FOR DETERMINING APPLICATION TIME OF BEAM

CROSS REFERENCE TO RELATED APPLICATION

This application is a US national phase application of International Application No. PCT/CN2021/102182, filed on Jun. 24, 2021, the content of which is incorporated herein by reference.

TECHNICAL FIELD

The present disclosure relates to the field of communication technologies, in particularly, to a method for determining an application time of a beam and a device thereof.

BACKGROUND

Generally, in new radio (NR) technologies, due to fast falling of high-frequency channels, beam-based sending and receiving are required in order to ensure a coverage area. A terminal device may receive a beam corresponding to a first carrier based on the first carrier, or may receive a beam corresponding to another carrier based on the first carrier. For a case of receiving the beam corresponding to another carrier based on the first carrier, the terminal device can be impossible to accurately determine an application time of the beam corresponding to another carrier. At present, how to determine the application time of a cross-carrier indicated beam has become an urgent problem to be solved.

SUMMARY

In a first aspect, an embodiment of the present disclosure provides a method for determining an application time of a beam. The method is performed by a terminal device. The method includes:

receiving downlink control information (DCI) based on a physical downlink control channel (PDCCH) of a first carrier, in which the DCI is configured to indicate a beam corresponding to a designated resource on a second carrier; sending indication information, in which, the indication information is configured to indicate a receiving state of the DCI; and determining an application time of the beam corresponding to the designated resource according to a sending time point of the indication information.

In a second aspect, an embodiment of the present disclosure provides a communication device. The communication device includes a processor and a memory storing a computer program executable by the processor. The processor is configured to:

receive downlink control information (DCI) based on a physical downlink control channel (PDCCH) of a first carrier, in which, the DCI is configured to indicate a beam corresponding to a designated resource on a second carrier;

send indication information, in which, the indication information is configured to indicate a receiving state of the DCI; and determine an application time of the beam corresponding to the designated resource according to a sending time point of the indication information.

In a third aspect, an embodiment of the present disclosure provides a computer-readable storage medium having stored thereon instructions that, when executed by a processor of a terminal device, cause the terminal device to perform a method for determining an application time of a beam is implemented. The method includes:

receiving downlink control information (DCI) based on a physical downlink control channel (PDCCH) of a first carrier, in which, the DCI is configured to indicate a beam corresponding to a designated resource on a second carrier;

sending indication information, in which, the indication information is configured to indicate a receiving state of the DCI; and determining an application time of the beam corresponding to the designated resource according to a sending time point of the indication information.

BRIEF DESCRIPTION OF THE DRAWINGS

The accompanying drawings of the present disclosure are briefly described below.

DETAILED DESCRIPTION

For ease of understanding, terms related to the present disclosure are introduced first.

1. Physical Downlink Control Channel (PDCCH)

The PDCCH may be configured to carry scheduling and other control information, which may specifically include a transmission format, uplink and downlink resource allocation, uplink scheduling license, power control, and retransmission information.

2. Physical Uplink Control Channel (PUCCH)

The PUCCH may be configured to send, by a terminal device to a network device, information related uplink control to, such as scheduling requests (SR), hybrid automatic repeat requests (HARQ), and channel status information (CSI), etc.

3. Physical Uplink Shared Channel (PUSCH)

The PUSCH, as a major uplink data carrier channel for a physical layer, may be configured for transmission of uplink data, and may carry control information, user business information, and broadcast business information, etc.

4. Physical Downlink Shared Channel (PUSCH), May be Configured for Transmission of Downlink Data.

In order to better understand a method for determining an application time of an across-carrier beam proposed in an embodiment of the present disclosure, a communication system applicable in an embodiment of the present disclosure will be described below.

Figure 1:
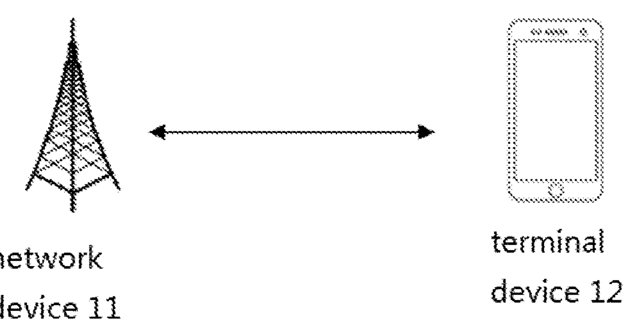
FIG. 1 is a schematic diagram illustrating an architecture of a communication system provided in an embodiment of the present disclosure.

Please referring to FIG. 1, FIG. 1 is a schematic diagram illustrating an architecture of a communication system 10 provided in an embodiment of the present disclosure. The communication system 10 may include, but is not limited to, a network device 11 and a terminal device 12. Numbers and forms of the devices as illustrated in FIG. 1 are for example only and do not constitute a limitation to embodiments of the present disclosure. In practical applications, the system may include two or more network devices 11 or two or more terminal devices 12. The communication system 10 as illustrated in FIG. 1 takes including one network device 11 and one terminal device 12 as an example.

It should be noted that the technical solution of embodiments of the present disclosure may be applied to various communication systems, for example, a long-term evolution (LTE) system, a 5th generation (5G) mobile communication system, a 5G new radio (NR) system, or other future new mobile communication systems, etc.

The network device 11 in embodiments of the present disclosure is a physical device for transmitting or receiving signals at a network side. For example, the network device 101 may be an evolved NodeB (eNB), a transmission reception point (TRP), a next generation NodeB (gNB) in an NR system, base stations in other future mobile communication systems, or access nodes in wireless fidelity (WiFi) systems. A specific technology and a specific device form adopted by the network device are not limited in embodiments of the present disclosure. The network device 11 provided in embodiments of the present disclosure may be composed of a central unit (CU) and a distributed unit (DU). The CU may also be referred to as a control unit. A CU-DU structure may be adopted to separate protocol layers of the network device, such as a base station. Functions of some protocol layers may be controlled centrally by the CU, and functions of the remaining or all protocol layers may be distributed within the DU which is centrally controlled by the CU.

The terminal device 12 in embodiments of the present disclosure is physical device for receiving or transmitting signals at a user side, such as a mobile phone. The terminal device may also be referred to as a terminal, a user equipment (UE), a mobile station (MS), a mobile terminal (MT), etc. The terminal device may be a vehicle with a communication feature, a smart vehicle, a mobile phone, a wearable device, a pad, a computer with a wireless transceiver feature, a virtual reality (VR) terminal, an augmented reality (AR) terminal, a wireless terminal in industrial control, and a wireless terminal in self-driving, a wireless terminal in remote medical surgery, a wireless terminal in smart grid, a wireless terminal in transportation safety, a wireless terminal in smart city, and a wireless terminal in smart home, etc. A specific technology and a specific device form adopted by the terminal device are not limited in embodiments of the present disclosure.

It can be understood that the communication system described in embodiments of the present disclosure is intended to provide a clearer explanation of the technical solution of embodiments of the present disclosure, and does not constitute a limitation on the technical solution proposed in embodiments of the present disclosure. As those ordinary skilled in the art known, with evolution of the system architecture and emergence of new business scenarios, the technical solution proposed in embodiments of the present disclosure is also applicable to the similar technical problem.

A method for determining an application time of an across-carrier beam, a device thereof provided in the present disclosure are described in detail with reference to the accompany drawings below.

Figure 2:
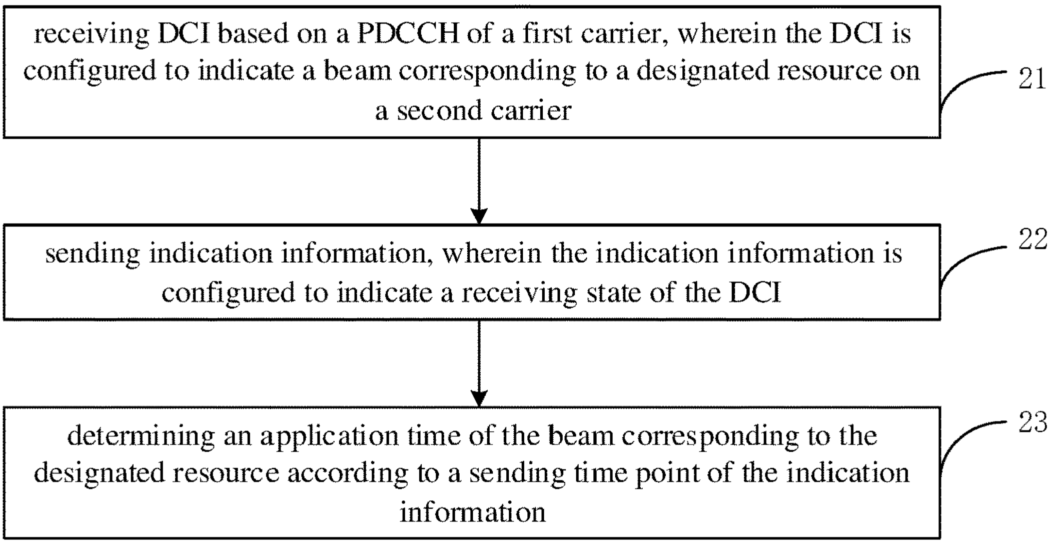
FIG. 2 is a flowchart illustrating a method for determining an application time of an across-carrier beam according to an embodiment of the present disclosure.

FIG. 2 is a flowchart illustrating a method for determining an application time of an across-carrier beam according to an embodiment of the present disclosure. The method may be performed by a terminal device. As illustrated in FIG. 2, the method may include, but is not limited to, the following blocks.

At block 21, DCI is received based on a PDCCH of a first carrier. The DCI is configured to indicate a beam corresponding to a designated resource on a second carrier.

Optionally, the designated resource may include at least one of a channel and a reference signal resource.

Optionally, the channel includes at least one of the following: a PDCCH, a PDSCH, a PUSCH, a PUCCH, a physical random access channel (PRACH), a physical broadcast channel (PBCH).

Optionally, the reference signal resource includes at least one of the following: a channel state information reference signal (CSI-RS), a sounding reference signal (SRS), a positioning reference signal (PRS), a tracking reference signal (TRS), and a synchronization signal block (SSB).

It may be understood that the designated resource may include one or more of the above. For example, the designated resource may include the PDCCH: or, may also include the PDCCH and the PDSCH, or, may also include the PDCCHCH, the PDSCH, and the PUSCH, or, may also include the PDCCHCH, the PDSCH, the PUSCH, the CSI-RS, the PRS, the SSB, etc., which will not be limited in the present disclosure.

Optionally, the designated resource may be determined according to at least one of the following: a control resource set identifier: a control resource set pool identifier: an identifier of a semi-persistent PDSCH: an identifier of a resource corresponding to a PUCCH: an identifier of a configured grant free PUSCH: a PRACH resource identifier: an SSB index: a reference signal resource identifier; and, a reference signal resource set identifier.

For example, the designated resource may be determined according to the control resource set identifier. That is, the designated resource may include at least one of: a PDCCH sent by a control resource set corresponding to the control resource set identifier, a PDSCH scheduled by the PDCCH sent by the control resource set corresponding to the control resource set identifier, a PUSCH scheduled by the PDCCH sent by the control resource set corresponding to the control resource set identifier, a PUCCH scheduled by the PDCCH sent by the control resource set corresponding to the control resource set identifier, a reference signal scheduled by the PDCCH sent by the control resource set corresponding to the control resource set identifier. The reference signal may include any at least one reference signal described in embodiments of the present disclosure, which will not be limited in the present disclosure.

For another example, the designated resource may be determined according to the control resource set pool identifier. That is, the designated resource may include at least one of: a PDCCH sent by at least one control resource set in at least one control resource set corresponding to the control resource set pool identifier, a PDSCH scheduled by the PDCCH sent by the at least one control resource set in the at least one control resource set corresponding to the control resource set pool identifier, a PUSCH scheduled by the PDCCH sent by the at least one control resource set in the at least one control resource set corresponding to the control resource set pool identifier, a PUCCH scheduled by the PDCCH sent by the at least one control resource set in the at least one control resource set corresponding to the control resource set pool identifier, a reference signal scheduled by the PDCCH sent by the at least one control resource set in the at least one control resource set corresponding to the control resource set pool identifier. The reference signal may include any at least one reference signal described in embodiments of the present disclosure, which will not be limited in the present disclosure.

A style or a presentation form of each identifier may be pre-agreed upon. For example, control resource set (CORESET) identifiers for transmitting PDCCHs may include PDCCH CORESET #1, PDCCH CORESET #2, etc., which will not be limited in the present disclosure.

In addition, the reference signal resources may be the CSI-RS, or may also be the SRS, or may also be the PRS, or may also be the TRS, or may also be the SSB, etc., which will not be limited in the present disclosure.

It can be understood that the reference signal resource may include one or more of the above, which will not be limited in the present disclosure.

For example, the reference signal resource may be the CSI-RS, which may be configured for channel state information measurement, or may also be configured for beam measurement, or may also be configured for path loss estimation, etc., which will not be limited in the present disclosure.

In addition, the SRS may be configured for codebook based channel state information measurement, or may also be configured for non-codebook based channel state information measurement, or may also be configured for beam measurement, or may also be configured for antenna switching, or may also be configured for positioning measurement, etc., which will not be limited in the present disclosure.

It can be understood that the reference signal resource set may include be one or more reference signal resources, which will not be limited in the present disclosure.

At block 22, indication information is sent. The indication information is configured to indicate a receiving state of the DCI.

There may be a plurality of receiving states of DCIs. For example, the receiving state of the DCI may be correct reception, or may be incorrect reception, etc., which will not be limited in the present disclosure.

Optionally, the indication information may be hybrid automatic repeat request acknowledgement (HARQ ACK), or may also be hybrid automatic repeat request non acknowledgement (HARQ NACK), or may also be any indication information that can indicate the receiving state of the DCI to the network device, etc., which will not be limited in the present disclosure.

At block 23, an application time of the beam corresponding to the designated resource is determined according to a sending time point of the indication information.

Optionally, a protocol agreement or a network device configuration may be that, the designated resource on the second carrier can use the beam indicated in the DCI after the indication information has been sent for T seconds. For example, when the sending time point of the indication information is at a time point t, the terminal device may determine the application time of the beam corresponding to the designated resource as a time point t+T based on the protocol agreement or the network device configuration. This disclosure will not make any limitation on this matter.

With implementing an embodiment of the present disclosure, the terminal device may receive the DCI based on the PDCCH of the first carrier, to obtain the beam corresponding to the designated resource on the second carrier. Then, the terminal device may send the indication information to indicate the receiving state of the DCI to a network device. Then, the terminal device may determine the application time of the beam corresponding to the designated resource according to the sending time point of the indication information. Therefore, the terminal device and the network device can maintain a consistent understanding for the application time of the cross-carrier beam, ensuring beam consistency, reducing an impact on communication transmission, and improving a performance of beam-based transmission.

Figure 3:
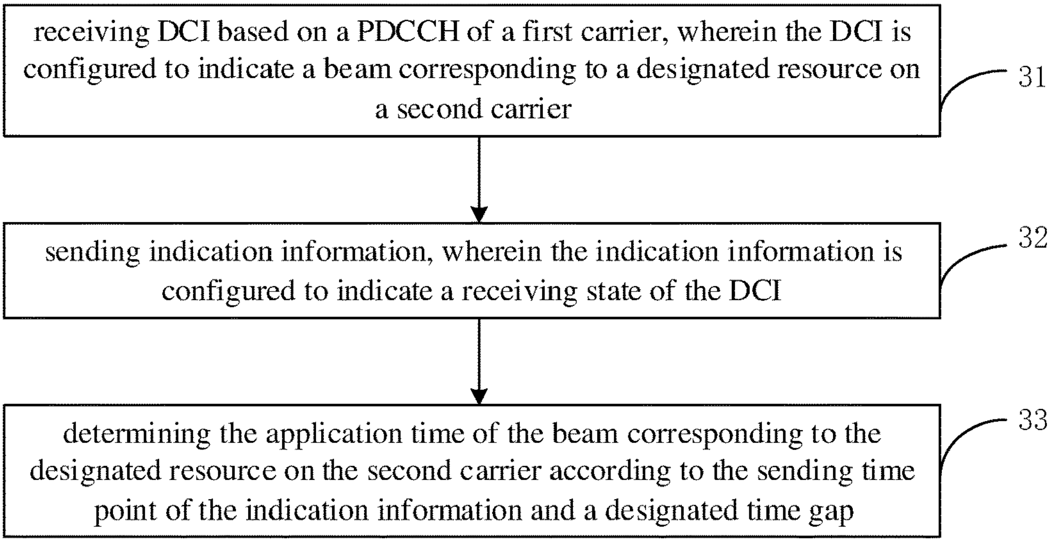
FIG. 3 is a flowchart illustrating a method for determining an application time of an across-carrier beam according to another embodiment of the present disclosure.

Please referring to FIG. 3, FIG. 3 is a flowchart illustrating a method for determining an application time of an across-carrier beam according to an embodiment of the present disclosure. The method may be performed by a terminal device. As illustrated in FIG. 3, the method may include, but is not limited to, the following blocks.

At block 31, DCI is received based on a PDCCH of a first carrier. The DCI is configured to indicate a beam corresponding to a designated resource on a second carrier.

Optionally, in the present disclosure, the first carrier and the second carrier may correspond to different serving cells of the terminal device respectively.

Optionally, the first carrier may correspond to a serving cell of the terminal device, and the second carrier may correspond to a non-serving cell or a coordinated cell of the terminal device.

Optionally, the first carrier may correspond to a non-serving cell of the terminal device, and the second carrier may correspond to a serving cell of the terminal device.

It should be noted that a specific content of the designated resource and the method of determining the designated resource can refer to description of other embodiments in the present disclosure, and will not be repeated herein.

At block 32, indication information is sent. The indication information is configured to indicate a receiving state of the DCI.

It should be noted that the specific contents and the implementations of blocks 31 and 32 can refer to the description of other embodiments in the present disclosure, and will not be repeated herein.

At block 33, the application time of the beam corresponding to the designated resource on the second carrier is determined according to the sending time point of the indication information and a designated time gap.

The designated time gap can be configured through a protocol agreement, a network device configuration, or determined by the terminal device, etc., which will not be limited in the present disclosure.

For example, when the designated time gap is K, and sending time point of the indication information is at a time point t, the terminal device may determine that the application time of the beam corresponding to the designated resource is at a time point t+K, and the like. The present disclosure will not limit this.

With implementing an embodiment of the present disclosure, the terminal device may receive the DCI based on the PDCCH of the first carrier, to obtain the beam corresponding to the designated resource on the second carrier. Then, the terminal device may send the indication information to indicate the receiving state of the DCI to the network device. Then, the terminal device may determine the application time of the beam corresponding to the designated resource according to the sending time point of the indication information and the designated time gap. Therefore, the terminal device and the network device can maintain a consistent understanding for the application time of the cross-carrier beam, ensuring beam consistency, reducing an impact on communication transmission, and improving a performance of beam-based transmission.

Figures 4, 5:
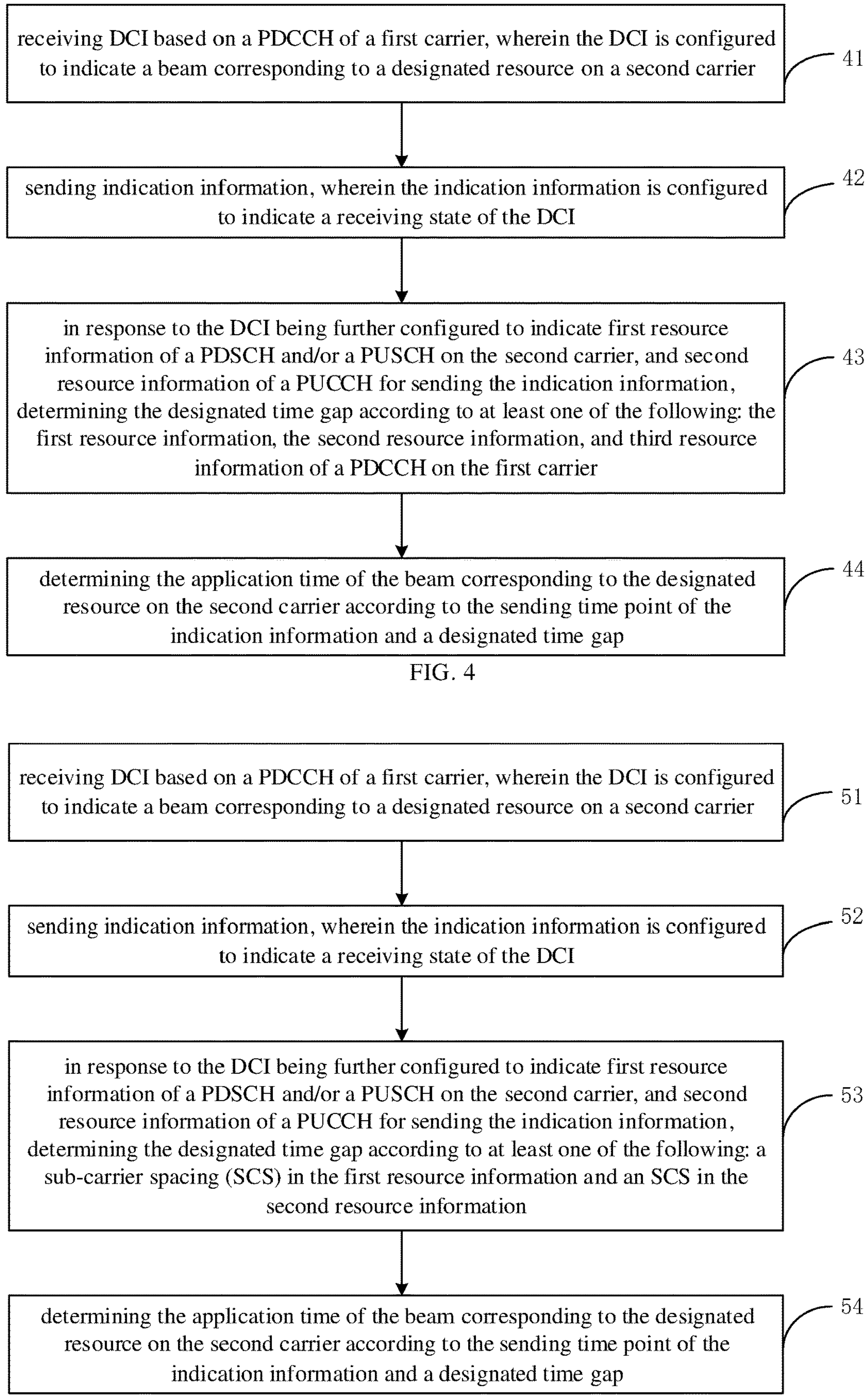
FIG. 4 is a flowchart illustrating a method for determining an application time of an across-carrier beam according to another embodiment of the present disclosure.
FIG. 5 is a flowchart illustrating a method for determining an application time of an across-carrier beam according to another embodiment of the present disclosure.

Please referring to FIG. 4, FIG. 4 is a flowchart illustrating a method for determining an application time of an across-carrier beam according to an embodiment of the present disclosure. The method may be performed by a terminal device. As illustrated in FIG. 4, the method may include, but is not limited to, the following blocks.

At block 41, DCI is received based on a PDCCH of a first carrier. The DCI is configured to indicate a beam corresponding to a designated resource on a second carrier.

It should be noted that a specific content of the designated resource and the method of determining the designated resource can refer to description of other embodiments in the present disclosure, and will not be repeated herein.

At block 42, indication information is sent. The indication information is configured to indicate a receiving state of the DCI.

It should be noted that the specific contents and the implementations of blocks 41 and 42 can refer to the description of other embodiments in the present disclosure, and will not be repeated herein.

At block 43, in response to the DCI being further configured to indicate first resource information of a PDSCH and/or a PUSCH on the second carrier, and second resource information of a PUCCH for sending the indication information, the designated time gap is determined according to at least one of the following: the first resource information, the second resource information, and third resource information of a PDCCH on the first carrier.

Optionally, the designated time gap may be determined according to a sub-carrier spacing (SCS) in the first resource information of the PDSCH on the second carrier. The sub carrier spacing (SCS) may be 15 kHz (kilo hertz), 30 kHz, 60 kHz, 120 kHz, 240 kHz, etc., which will not be limited in the present disclosure.

For example, in a protocol agreement or a network device configuration, when the SCS in the first resource information is 15 kHz, the corresponding designated time gap is T1; when the SCS in the first resource information is 30 kHz, the corresponding designated time gap is T2; when the SCS in the first resource information is 60 kHz, the corresponding designated time gap is T3, etc. Thus, the terminal device may determine the corresponding designated time gap based on the SCS in the first resource information. Therefore, the terminal device and the network device can maintain a consistent understanding for the designated time gap, providing assurance for beam-based transmission.

Optionally, the designated time gap may be determined according to the first resource information of the PUSCH on the second carrier, or the designated time gap may be determined according to the first resource information of the PDSCH and the PUSCH on the second carrier. The specific content and implementation can refer to the description of respective embodiments of the present disclosure, and will not be repeated herein.

Optionally, the designated time gap may be determined according to the SCS in the second resource information.

For example, in the protocol agreement or the network device configuration, when the SCS in the second resource information is 15 kHz, the corresponding designated time gap is T4; when the SCS in the second resource information is 30 kHz, the corresponding designated time gap is T5; when the SCS in the second resource information is 60 kHz, the corresponding designated time gap is T6, etc. Thus, the terminal device may determine the corresponding designated time gap based on the SCS in the second resource information. Therefore, the terminal device and the network device can maintain a consistent understanding for the designated time gap, providing assurance for beam-based transmission.

Optionally, the designated time gap may be determined according to the sub-carrier spacing (SCS) in the first resource information and the SCS in the second resource information.

For example, in the protocol agreement or the network device configuration, when the SCS in the first resource information is the same as the SCS in the second resource information, the corresponding designated time gap is T7; when the SCS in the first resource information is greater than the SCS in the second resource information, the corresponding designated time gap is T8; when the SCS in the first resource information is less than the SCS in the second resource information, the corresponding designated time gap is T9, etc. Thus, the terminal device may determine the corresponding designated time gap based on the SCS in the first resource information and the SCS in the second resource information. Therefore, the terminal device and the network device can maintain a consistent understanding for the designated time gap, providing assurance for beam-based transmission.

It should be noted that the above example is only illustrative and cannot be used as limitations on the method of determining the designated time gap and other methods in an embodiment of the present disclosure.

Optionally, the designated time gap can also be determined based on third resource information, the specific content and implementation of which can refer to the description of respective embodiments in the present disclosure, and will not be repeated here.

It can be understood that the designated time gap may be determined by using one term of the above, or may be determined by using more terms of the above, which will not be limited in the present disclosure.

At block 44, the application time of the beam corresponding to the designated resource on the second carrier is determined according to the sending time point of the indication information and a designated time gap.

It should be noted that the specific contents and the implementations of the block 44 can refer to the description of other embodiments in the present disclosure, and will not be repeated herein.

With implementing an embodiment of the present disclosure, the terminal device may receive the DCI based on the PDCCH of the first carrier, to obtain the beam corresponding to the designated resource on the second carrier. Then, the terminal device may send the indication information to indicate the receiving state of the DCI to the network device. Then, the terminal device may first determine the designated time gap according to the first resource information, the second resource information, and the third resource information of the PDCCH on the first carrier, and then determine the application time of the beam corresponding to the designated resource according to the sending time point of the indication information and the designated time gap. Therefore, the terminal device and the network device can maintain a consistent understanding for the application time of the cross-carrier beam, ensuring beam consistency, reducing an impact on communication transmission, and improving a performance of beam-based transmission.

Please referring to FIG. 5, FIG. 5 is a flowchart illustrating a method for determining an application time of an across-carrier beam according to an embodiment of the present disclosure. The method may be performed by a terminal device. As illustrated in FIG. 5, the method may include, but is not limited to, the following blocks.

At block 51, DCI is received based on a PDCCH of a first carrier. The DCI is configured to indicate a beam corresponding to a designated resource on a second carrier.

It should be noted that a specific content of the designated resource and the method of determining the designated resource can refer to description of other embodiments in the present disclosure, and will not be repeated herein.

At block 52, indication information is sent. The indication information is configured to indicate a receiving state of the DCI.

It should be noted that the specific contents and the implementations of blocks 51 and 52 can refer to the description of other embodiments in the present disclosure, and will not be repeated herein.

At block 53, in response to the DCI being further configured to indicate first resource information of a PDSCH and/or a PUSCH on the second carrier, and second resource information of a PUCCH for sending the indication information, the designated time gap is determined according to at least one of a sub-carrier spacing (SCS) in the first resource information and an SCS in the second resource information.

Optionally, in response to an SCS in the third resource information being greater than or equal to the SCS in the first resource information, the designated time gap is determined according to the SCS in the first resource information.

It can be understood that in a case where the SCS in the third resource information is greater than or equal to the SCS in the first resource information means that the SCS in the third resource information is not less than the SCS in the first resource information.

For example, in a protocol agreement or a network device configuration, in the case where the SCS in the third resource information is greater than or equal to the SCS in the first resource information, the designated time gap is related to the SCS in the first resource information. For example, the designated time gap includes N symbols, when the SCS in the first resource information is 15 kHz, the corresponding designated time gap is a length of time occupied by N symbols in a case of the SCS being 15 KHz, and when the SCS in the first resource information is 30 kHz, the corresponding designated time gap is a length of time occupied by N symbols in a case of the SCS being 30 KHz.

Optionally, in the protocol agreement or the network device configuration, a correspondence between an SCS in first resource information and a designated time gap may be provided in the case where the SCS in the third resource information is greater than or equal to the SCS in the first resource information.

Therefore, in the case where the SCS in the third resource information is greater than or equal to the SCS in the first resource information, the terminal device can determine the corresponding designated time gap based on the SCS in the first resource information. Thus, the terminal device and the network device can maintain a consistent understanding for the designated time gap, providing assurance for beam-based transmission.

Optionally, in response to the SCS in the third resource information being greater than or equal to the SCS in the first resource information, the designated time gap is determined according to the SCS in the second resource information.

For example, in a protocol agreement or a network device configuration, in the case where the SCS in the third resource information is greater than or equal to the SCS in the first resource information, the designated time gap is related to the SCS in the second resource information. For example, the designated time gap includes N symbols, when the SCS in the second resource information is 15 kHz, the corresponding designated time gap is a length of time occupied by N symbols in a case of the SCS being 15 KHz, and when the SCS in the second resource information is 30 kHz, the corresponding designated time gap is a length of time occupied by N symbols in a case of the SCS being 30 KHz.

Optionally, in the protocol agreement or the network device configuration, a correspondence between an SCS in second resource information and a designated time gap may be provided in the case where the SCS in the third resource information is greater than or equal to the SCS in the first resource information.

Therefore, in the case where the SCS in the third resource information is greater than or equal to the SCS in the first resource information, the terminal device can determine the corresponding designated time gap based on the SCS in the second resource information. Thus, the terminal device and the network device can maintain a consistent understanding for the designated time gap, providing assurance for beam-based transmission.

Optionally, in response to the SCS in the third resource information being greater than or equal to the SCS in the second resource information, the designated time gap is determined according to the SCS in the first resource information.

For example, in a protocol agreement or a network device configuration, in the case where the SCS in the third resource information is greater than or equal to the SCS in the second resource information, the designated time gap is related to the SCS in the first resource information. For example, the designated time gap includes N symbols, when the SCS in the first resource information is 15 kHz, the corresponding designated time gap is a length of time occupied by N symbols in a case of the SCS being 15 KHz, and when the SCS in the first resource information is 30 kHz, the corresponding designated time gap is a length of time occupied by N symbols in a case of the SCS being 30 KHz.

Optionally, in the protocol agreement or the network device configuration, a correspondence between an SCS in first resource information and a designated time gap may be provided in the case where the SCS in the third resource information is greater than or equal to the SCS in the second resource information.

Therefore, in the case where the SCS in the third resource information is greater than or equal to the SCS in the second resource information, the terminal device can determine the corresponding designated time gap based on the SCS in the first resource information. Thus, the terminal device and the network device can maintain a consistent understanding for the designated time gap, providing assurance for beam-based transmission.

Optionally, in response to the SCS in the third resource information being greater than or equal to the SCS in the first resource information, the designated time gap is determined according to the SCS in the second resource information.

For example, in a protocol agreement or a network device configuration, in the case where the SCS in the third resource information is greater than or equal to the SCS in the second resource information, the designated time gap is related to the SCS in the second resource information. For example, the designated time gap includes N symbols, when the SCS in the second resource information is 15 kHz, the corresponding designated time gap is a length of time occupied by N symbols in a case of the SCS being 15 KHz, and when the SCS in the second resource information is 30 kHz, the corresponding designated time gap is a length of time occupied by N symbols in a case of the SCS being 30 KHz.

Optionally, in the protocol agreement or the network device configuration, a correspondence between an SCS in second resource information and a designated time gap may be provided in the case where the SCS in the third resource information is greater than or equal to the SCS in the second resource information.

Therefore, in the case where the SCS in the third resource information is greater than or equal to the SCS in the second resource information, the terminal device can determine the corresponding designated time gap based on the SCS in the second resource information. Thus, the terminal device and the network device can maintain a consistent understanding for the designated time gap, providing assurance for beam-based transmission.

It can be understood that the designated time gap may be determined by using one of the above manners, or may be determined by using the above multiple manners, which will not be limited in the present disclosure.

At block 54, the application time of the beam corresponding to the designated resource on the second carrier is determined according to the sending time point of the indication information and a designated time gap.

It should be noted that the specific contents and the implementations of the block 54 can refer to the description of other embodiments in the present disclosure, and will not be repeated herein.

With implementing an embodiment of the present disclosure, the terminal device may receive the DCI based on the PDCCH of the first carrier, to obtain the beam corresponding to the designated resource on the second carrier. Then, the terminal device may send the indication information to indicate the receiving state of the DCI to the network device. Then, the terminal device may first determine the designated time gap according to the SCS in the first resource information and/or the SCS in the second resource information, and then determine the application time of the beam corresponding to the designated resource according to the sending time point of the indication information and the designated time gap. Therefore, the terminal device and the network device can maintain a consistent understanding for the application time of the cross-carrier beam, ensuring beam consistency, reducing an impact on communication transmission, and improving a performance of beam-based transmission.

Figure 6:
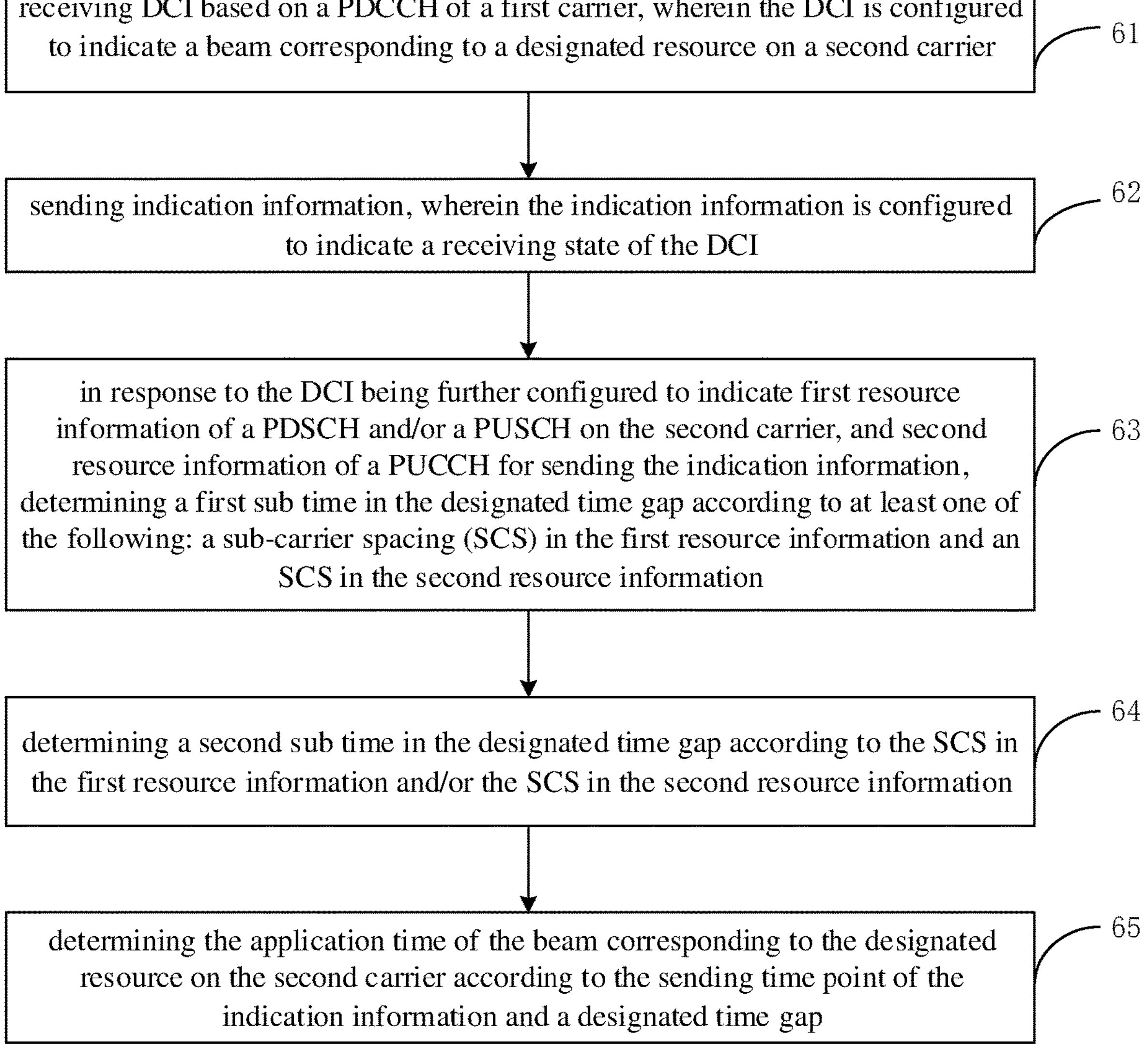
FIG. 6 is a flowchart illustrating a method for time domain resource assignment according to an embodiment of the present disclosure.

Please referring to FIG. 6, FIG. 6 is a flowchart illustrating a method for determining an application time of an across-carrier beam according to an embodiment of the present disclosure. The method may be performed by a terminal device. As illustrated in FIG. 6, the method may include, but is not limited to, the following blocks.

At block 61, DCI is received based on a PDCCH of a first carrier. The DCI is configured to indicate a beam corresponding to a designated resource on a second carrier.

It should be noted that a specific content of the designated resource and the method of determining the designated resource can refer to description of other embodiments in the present disclosure, and will not be repeated herein.

At block 62, indication information is sent. The indication information is configured to indicate a receiving state of the DCI.

It should be noted that the specific contents and the implementations of blocks 61 and 62 can refer to the description of other embodiments in the present disclosure, and will not be repeated herein.

At block 63, in response to the DCI being further configured to indicate first resource information of a PDSCH and/or a PUSCH on the second carrier, and second resource information of a PUCCH for sending the indication information, a first sub time in the designated time gap is determined according to at least one of a sub-carrier spacing (SCS) in the first resource information and an SCS in the second resource information.

Optionally, in response to an SCS in the third resource information being less than the SCS in the first resource information, the first sub time in the designated time gap may be determined according to the SCS in the first resource information.

The SCS may be 15 kHz, 30 kHz, 60 kHz, 120 kHz, 240 kHz, etc., and will not be limited in the present disclosure.

For example, in a protocol agreement or a network device configuration, in a case where the SCS in the third resource information is less than the SCS in the first resource information, the first sub time in the designated time gap is related to the SCS in the first resource information. For example, the designated time gap includes N symbols, when the SCS in the first resource information is 15 kHz, the corresponding designated time gap is a length of time occupied by N symbols in a case of the SCS being 15 KHz, and when the SCS in the first resource information is 30 kHz, the corresponding designated time gap is a length of time occupied by N symbols in a case of the SCS being 30 KHz, etc. The present disclosure will make no limitation.

Therefore, the terminal device can determine the first sub time in the corresponding designated time gap based on the SCS in the first resource information and the correspondence. Thus, the terminal device and the network device can maintain a consistent understanding for the first sub time in the designated time gap, providing assurance for beam-based transmission.

Optionally, in response to the SCS in the third resource information being less than the SCS in the first resource information, the first sub time in the designated time gap may be determined according to the SCS in the second resource information, the specific content and implementation of which may refer to the description of other embodiments in the disclosure, and will not be repeated herein.

Optionally, in response to the SCS in the third resource information being less than the SCS in the second resource information, the first sub time in the designated time gap may be determined according to the SCS in the first resource information, the specific content and implementation of which may refer to the description of other embodiments in the disclosure, and will not be repeated herein.

Optionally, in response to the SCS in the third resource information being less than the SCS in the second resource information, the first sub time in the designated time gap may be determined according to the SCS in the second resource information, the specific content and implementation of which may refer to the description of other embodiments in the disclosure, and will not be repeated herein.

It can be understood that the designated time gap may be determined by using one of the above manners, or may be determined by using the above multiple manners, which will not be limited in the present disclosure.

At block 64, the second sub time in the designated time gap is determined according to the SCS in the first resource information and/or the SCS in the second resource information.

Optionally, the second sub time in the designated time gap is determined according to the SCS in the first resource information and the SCS in the third resource information.

For example, in the protocol agreement or the network device configuration, when the SCS in the third resource information is less that the SCS in the first resource information, the second sub time in the designated time gap is T.

Optionally, in the protocol agreement or the network device configuration, it may also provide a correspondence between an SCS in third resource information, an SCS in first resource information, and a second sub time in a designated time gap.

Therefore, the terminal device may determine the second sub time in the corresponding designated time gap based on the SCS in the third resource information, the SCS in the first resource information and the correspondence. Thus, the terminal device and the network device can maintain a consistent understanding for the second sub time in the designated time gap, providing assurance for beam-based transmission.

Optionally, in the present disclosure, the second sub time in the designated time gap is determined according to the SCS in the second resource information and the SCS in the third resource information.

For example, in the protocol agreement or the network device configuration, it may also provide a correspondence between an SCS in third resource information, an SCS in second resource information, and a second sub time in a designated time gap. Therefore, the terminal device may determine the second sub time in the corresponding designated time gap based on the SCS in the third resource information and the SCS in the second resource information. Thus, the terminal device and the network device can maintain a consistent understanding for the second sub time in the designated time gap, providing assurance for beam-based transmission.

Optionally, in the present disclosure, the second sub time in the designated time gap is determined according to the SCS in the first resource information, the SCS in the second resource information and the SCS in the third resource information.

For example, in the protocol agreement or the network device configuration, it may also provide a correspondence between an SCS in third resource information, an SCS in second resource information, an SCS in a first resource information and a second sub time in a designated time gap. Therefore, the terminal device may determine the second sub time in the corresponding designated time gap based on the SCS in the third resource information, the SCS in the second resource information and the SCS in the first resource information. Thus, the terminal device and the network device can maintain a consistent understanding for the second sub time in the designated time gap, providing assurance for beam-based transmission.

Optionally, in the present disclosure, the second sub time may be directly proportional to the SCS in the first resource information and inversely proportional to the SCS in the third resource information.

For example, the larger the SCS in the first resource information, the larger the second sub time correspondingly. The larger the SCS in the third resource information, the smaller the second sub time. The present disclosure does not make any limitations.

Optionally, in the present disclosure, the second sub time may be directly proportional to the SCS in the second resource information and inversely proportional to the SCS in the third resource information.

For example, the larger the SCS in the second resource information, the larger the second sub time correspondingly. The larger the SCS in the third resource information, the smaller the second sub time. The present disclosure will not make any limitations.

Optionally, in the present disclosure, the second sub time may be directly proportional to the SCS in the first resource information and the SCS in the second resource information and inversely proportional to the SCS in the third resource information.

Optionally, the first sub time may include an integer number of time units, and the second sub time may include an integer number of time units.

The time unit may be at least one of a slot, a mini-slot, and a symbol, and will not be limited in the present disclosure.

It can be understood that the first sub time may include an integer number of slots, or the first sub time may include an integer number of mini-slots, or the first sub time may include an integer number of symbols, or the first sub time may include an integer number of slots and an integer number of mini-slots, or the first sub time may include an integer number of slots and an integer number of symbols, the first sub time may include an integer number of mini-slots and an integer number of symbols; or the first sub time may include an integer number of slots, an integer number of mini-slots, and an integer number of symbols.

In addition, the second sub time may include an integer number of slots, or the second sub time may include an integer number of mini-slots, or the second sub time may include an integer number of symbols, or the second sub time may include an integer number of slots and an integer number of mini-slots, or the second sub time may include an integer number of slots and an integer number of symbols, the second sub time may include an integer number of mini-slots and an integer number of symbols; or the second sub time may include an integer number of slots, an integer number of mini-slots, and an integer number of symbols.

It can be understood that the time units included in the first sub time and the second sub time may be any combination of the above. For example, the first sub time includes an integer number of symbols, and the second sub time includes an integer number of symbols. For another example, the first sub time includes an integer number of mini-slots, and the second sub time includes an integer number of symbols, and the like. The present disclosure will not make any limitations.

Therefore, the designated time gap may also include at least one of an integer number of slots, an integer number of mini-slots, and an integer number of symbols, which will not be limited in the present disclosure.

At block 65, the application time of the beam corresponding to the designated resource on the second carrier is determined according to the sending time point of the indication information and a designated time gap.

It can be understood that in this disclosure, the designated time gap may be a sum of the first sub time and the second sub time.

For example, when the sending time point of the indication information is at a time point t, the first sub time is T1, and the second sub time is T2, the application time of the beam corresponding to the designated resource on the second carrier may be t+T1+T2. The present disclosure will not make any limitations.

With implementing an embodiment of the present disclosure, the terminal device may receive the DCI based on the PDCCH of the first carrier, to obtain the beam corresponding to the designated resource on the second carrier. Then, the terminal device may send the indication information to indicate the receiving state of the DCI to the network device. Then, the terminal device may determine the first sub time and the second sub time in the designated time pacing according to the SCS in the first resource information, the SCS in the second resource information, and/or the SCS in the third resource information, and may determine the application time of the beam corresponding to the designated resource according to the sending time point of the indication information and the designated time gap. Therefore, the terminal device and the network device can maintain a consistent understanding for the application time of the cross-carrier beam, ensuring beam consistency, reducing an impact on communication transmission, and improving a performance of beam-based transmission.

Figures 7, 8:
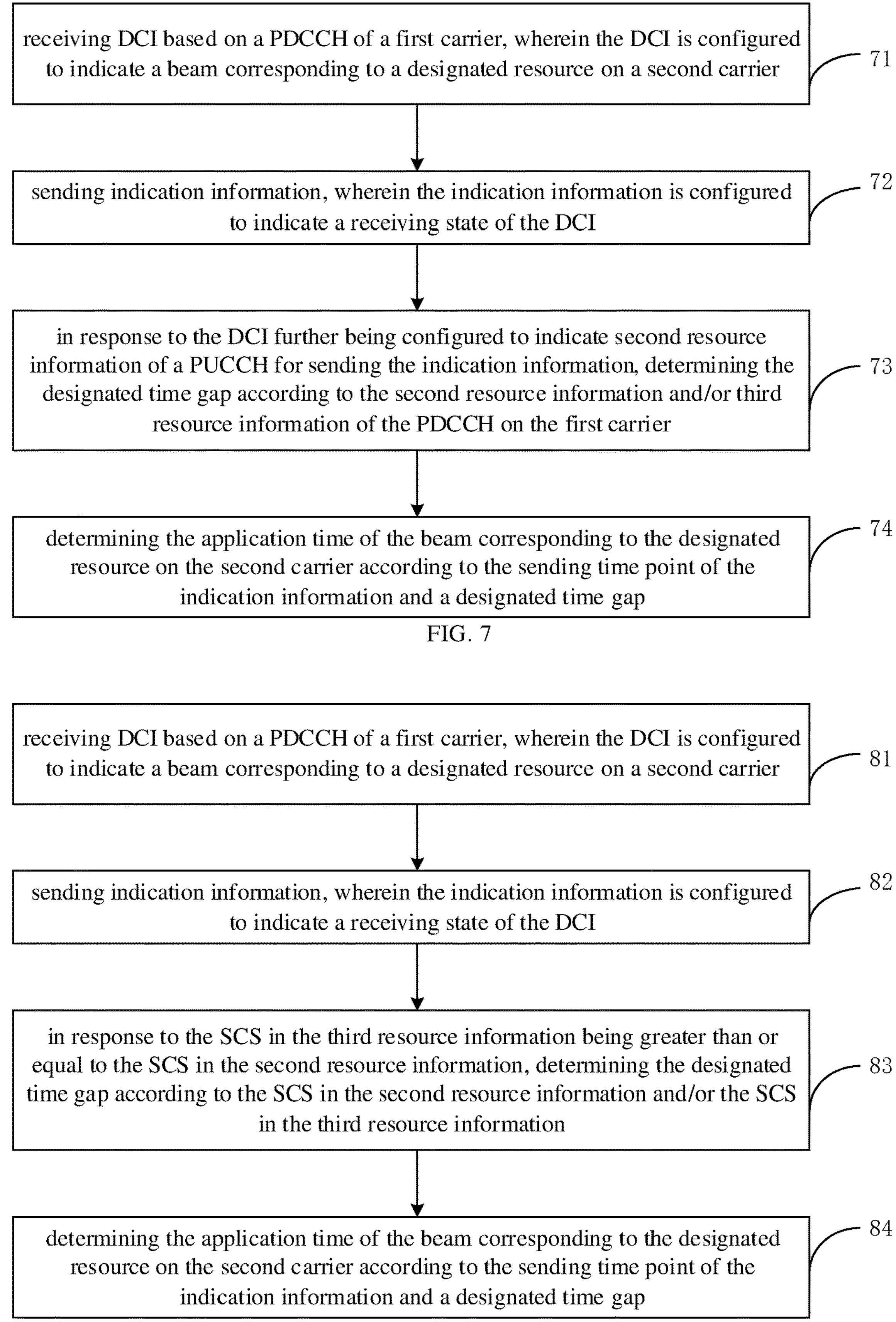
FIG. 7 is a flowchart illustrating a method for determining an application time of an across-carrier beam according to another embodiment of the present disclosure.
FIG. 8 is a flowchart illustrating a method for determining an application time of an across-carrier beam according to another embodiment of the present disclosure.

Please referring to FIG. 7, FIG. 7 is a flowchart illustrating a method for determining an application time of an across-carrier beam according to an embodiment of the present disclosure. The method may be performed by a terminal device. As illustrated in FIG. 7, the method may include, but is not limited to, the following blocks.

At block 71, DCI is received based on a PDCCH of a first carrier. The DCI is configured to indicate a beam corresponding to a designated resource on a second carrier.

It should be noted that a specific content of the designated resource and the method of determining the designated resource can refer to description of other embodiments in the present disclosure, and will not be repeated herein.

At block 72, indication information is sent. The indication information is configured to indicate a receiving state of the DCI.

It should be noted that the specific contents and the implementations of blocks 71 and 72 can refer to the description of other embodiments in the present disclosure, and will not be repeated herein.

At block 73, in response to the DCI further being configured to indicate second resource information of a PUCCH for sending the indication information, the designated time gap is determined according to the second resource information and/or third resource information of the PDCCH on the first carrier.

It may be understood that the designated time gap may be determined according to the second resource information; or the designated time gap may be determined according to the third resource information; or the designated time gap may be determined according to the second resource information and the third resource information. The specific content and implementation may refer to the description of other embodiments in the disclosure, and will not be repeated herein.

At block 74, the application time of the beam corresponding to the designated resource on the second carrier is determined according to the sending time point of the indication information and a designated time gap.

It should be noted that the specific contents and the implementations of the block 74 can refer to the description of other embodiments in the present disclosure, and will not be repeated herein.

With implementing an embodiment of the present disclosure, the terminal device may receive the DCI based on the PDCCH of the first carrier, to obtain the beam corresponding to the designated resource on the second carrier. Then, the terminal device may send the indication information to indicate the receiving state of the DCI to the network device. Then, the terminal device may first determine the designated time gap according to the second resource information and the third resource information, and determine the application time of the beam corresponding to the designated resource according to the sending time point of the indication information and the designated time gap. Therefore, the terminal device and the network device can maintain a consistent understanding for the application time of the cross-carrier beam, ensuring beam consistency, reducing an impact on communication transmission, and improving a performance of beam-based transmission.

Please referring to FIG. 8, FIG. 8 is a flowchart illustrating a method for determining an application time of an across-carrier beam according to an embodiment of the present disclosure. The method may be performed by a terminal device. As illustrated in FIG. 8, the method may include, but is not limited to, the following blocks.

At block 81, DCI is received based on a PDCCH of a first carrier. The DCI is configured to indicate a beam corresponding to a designated resource on a second carrier.

It should be noted that a specific content of the designated resource and the method of determining the designated resource can refer to description of other embodiments in the present disclosure, and will not be repeated herein.

At block 82, indication information is sent. The indication information is configured to indicate a receiving state of the DCI.

It should be noted that the specific contents and the implementations of blocks 81 and 82 can refer to the description of other embodiments in the present disclosure, and will not be repeated herein.

At block 83, in response to the SCS in the third resource information being greater than or equal to the SCS in the second resource information, the designated time gap is determined according to the SCS in the second resource information and/or the SCS in the third resource information.

Optionally, in a case that the SCS in the third resource information is greater than or equal to the SCS in the second resource information, the designated time gap may be determined according to the SCS in the second resource information.

For example, in a protocol agreement or a network device configuration, in a case where the SCS in the third resource information is greater than or equal to the SCS in the second resource information, the designated time gap is related to the SCS in the second resource information. For example, the designated time gap includes N symbols, when the SCS in the second resource information is 15 kHz, the corresponding designated time gap is a length of time occupied by N symbols in a case of the SCS being 15 KHz; and when the SCS in the second resource information is 30 kHz, the corresponding designated time gap is a length of time occupied by N symbols in a case of the SCS being 30 KHz.

Optionally, in the protocol agreement or the network device configuration, a correspondence between an SCS in second resource information and a designated time gap may be provided in the case where the SCS in the third resource information is greater than or equal to the SCS in the second resource information.

Therefore, in the case where the SCS in the third resource information is greater than or equal to the SCS in the second resource information, the terminal device can determine the corresponding designated time gap based on the SCS in the second resource information. Thus, the terminal device and the network device can maintain a consistent understanding for the designated time gap, providing assurance for beam-based transmission.

Optionally, in a case that the SCS in the third resource information is greater than or equal to the SCS in the second resource information, the designated time gap may be determined according to the SCS in the third resource information. The specific content and implementation can refer to the description of respective embodiments of the present disclosure, and will not be repeated herein.

Optionally, in a case that the SCS in the third resource information is greater than or equal to the SCS in the second resource information, the designated time gap may be determined according to the SCS in the second resource information and the SCS in the third resource information. The specific content and implementation can refer to the description of respective embodiments of the present disclosure, and will not be repeated herein.

At block 84, the application time of the beam corresponding to the designated resource on the second carrier is determined according to the sending time point of the indication information and a designated time gap.

It should be noted that the specific contents and the implementations of the block 84 can refer to the description of other embodiments in the present disclosure, and will not be repeated herein.

With implementing an embodiment of the present disclosure, the terminal device may receive the DCI based on the PDCCH of the first carrier, to obtain the beam corresponding to the designated resource on the second carrier. Then, the terminal device may send the indication information to indicate the receiving state of the DCI to the network device. Then, the terminal device may first, in response to the SCS in the third resource information being greater than or equal to the SCS in the second resource information, determine the designated time gap according to the second resource information and/or the third resource information, and determine the application time of the beam corresponding to the designated resource according to the sending time point of the indication information and the designated time gap. Therefore, the terminal device and the network device can maintain a consistent understanding for the application time of the cross-carrier beam, ensuring beam consistency, reducing an impact on communication transmission, and improving a performance of beam-based transmission.

Figure 9:
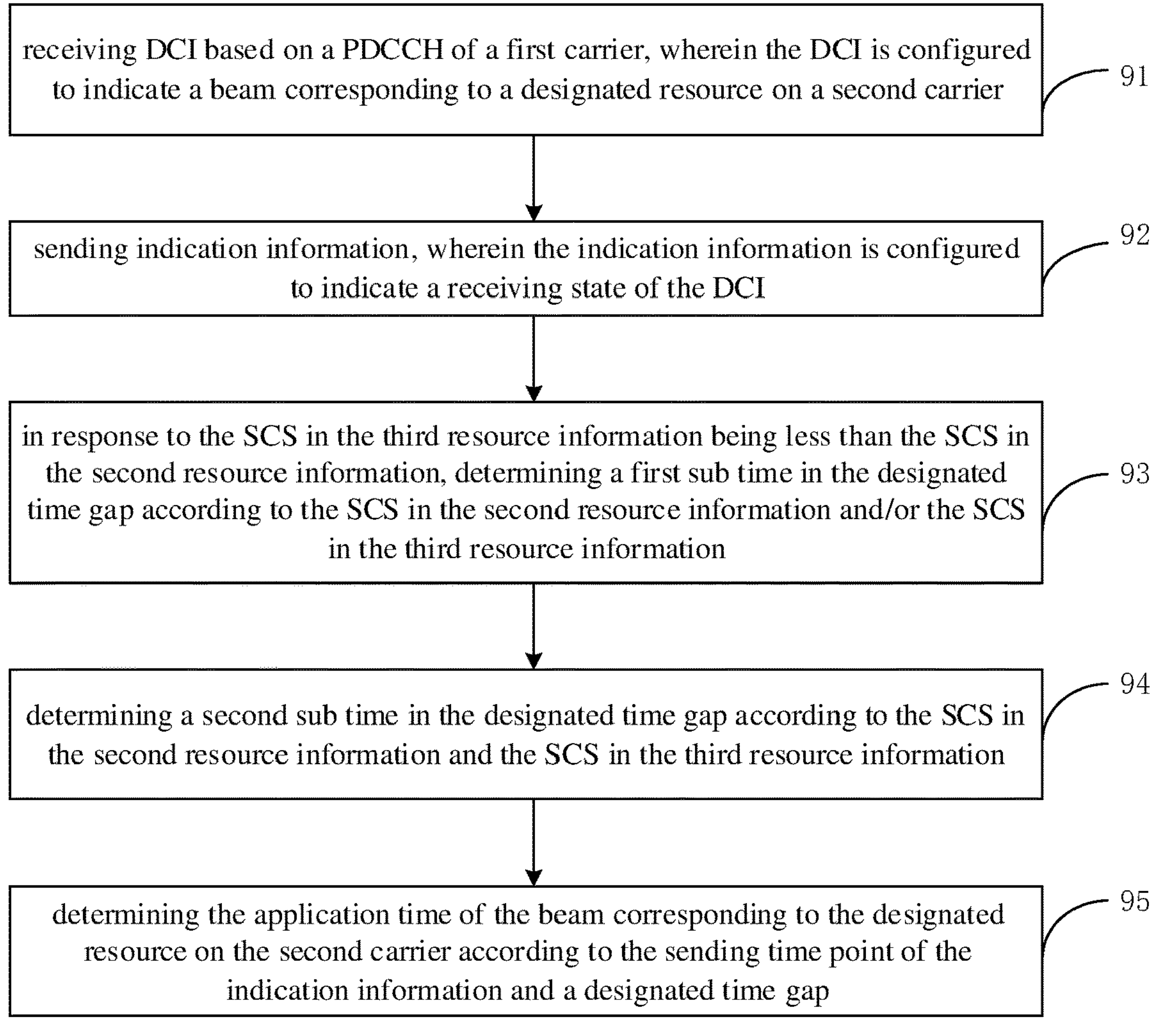
FIG. 9 is a flowchart illustrating a method for determining an application time of an across-carrier beam according to another embodiment of the present disclosure.

Please referring to FIG. 9, FIG. 9 is a flowchart illustrating a method for determining an application time of an across-carrier beam according to an embodiment of the present disclosure. The method may be performed by a terminal device. As illustrated in FIG. 9, the method may include, but is not limited to, the following blocks.

At block 91, DCI is received based on a PDCCH of a first carrier. The DCI is configured to indicate a beam corresponding to a designated resource on a second carrier.

It should be noted that a specific content of the designated resource and the method of determining the designated resource can refer to description of other embodiments in the present disclosure, and will not be repeated herein.

At block 92, indication information is sent. The indication information is configured to indicate a receiving state of the DCI.

It should be noted that the specific contents and the implementations of blocks 91 and 92 can refer to the description of other embodiments in the present disclosure, and will not be repeated herein.

At block 93, in response to the SCS in the first resource information being less than the SCS in the second resource information, a first sub time in the designated time gap is determined according to the SCS in the second resource information and/or the SCS in the third resource information.

Optionally, in a case that the SCS in the third resource information is less than the SCS in the second resource information, the first sub time in the designated time gap may be determined according to the SCS in the second resource information.

For example, in a protocol agreement or a network device configuration, in a case where the SCS in the third resource information is less than the SCS in the second resource information, the SCS in the second resource information is related to in the first sub time in the designated time gap. Therefore, the terminal device may be determined the first sub time in the designated time gap according to the SCS in the second resource information. Thus, the terminal device and the network device can maintain a consistent understanding for the first sub time in the designated time gap, providing assurance for beam-based transmission.

Optionally, in a case that the SCS in the third resource information is less than the SCS in the second resource information, the designated time gap may be determined according to the SCS in the third resource information. The specific content and implementation can refer to the description of respective embodiments of the present disclosure, and will not be repeated herein.

Optionally, in a case that the SCS in the third resource information is less than the SCS in the second resource information, the designated time gap may be determined according to the SCS in the second resource information and the SCS in the third resource information. The specific content and implementation can refer to the description of respective embodiments of the present disclosure, and will not be repeated herein.

At block S94, a second sub time in the designated time gap is determined according to the SCS in the second resource information and the SCS in the third resource information.

For example, in the protocol agreement or the network device configuration, a correspondence between the SCS in the third resource information, the SCS in the second resource information, and the second sub time in the designated time gap is provided. Thus, the terminal device may be determined the second sub time in the designated time gap according to the SCS in the third resource information and the SCS in the second resource information. Therefore, the terminal device and the network device can maintain a consistent understanding for the second sub time in the designated time gap, providing assurance for beam-based transmission.

Optionally, in the present disclosure, the second sub time may be directly proportional to the SCS in the second resource information and inversely proportional to the SCS in the third resource information.

Optionally, the first sub time may include an integer number of time units, and the second sub time may include an integer number of time units.

The time unit may be at least one of a slot, a mini-slot, and a symbol, and will not be limited in the present disclosure.

It can be understood that the first sub time may include an integer number of slots, or the first sub time may include an integer number of mini-slots, or the first sub time may include an integer number of symbols, or the first sub time may include an integer number of slots and an integer number of mini-slots, or the first sub time may include an integer number of slots and an integer number of symbols, the first sub time may include an integer number of mini-slots and an integer number of symbols; or the first sub time may include an integer number of slots, an integer number of mini-slots, and an integer number of symbols.

In addition, the second sub time may include an integer number of slots, or the second sub time may include an integer number of mini-slots, or the second sub time may include an integer number of symbols, or the second sub time may include an integer number of slots and an integer number of mini-slots, or the second sub time may include an integer number of slots and an integer number of symbols, the second sub time may include an integer number of mini-slots and an integer number of symbols; or the second sub time may include an integer number of slots, an integer number of mini-slots, and an integer number of symbols.

It can be understood that the time units included in the first sub time and the second sub time may be any combination of the above. For example, the first sub time includes an integer number of symbols, and the second sub time includes an integer number of symbols. For another example, the first sub time includes an integer number of mini-slots, and the second sub time includes an integer number of symbols, and the like. The present disclosure will not make any limitations.

Therefore, the designated time gap may also include at least one of an integer number of slots, an integer number of mini-slots, and an integer number of symbols, which will not be limited in the present disclosure.

At block 95, the application time of the beam corresponding to the designated resource on the second carrier is determined according to the sending time point of the indication information and a designated time gap.

It should be noted that the specific contents and the implementations of the block 95 can refer to the description of other embodiments in the present disclosure, and will not be repeated herein.

With implementing an embodiment of the present disclosure, the terminal device may receive the DCI based on the PDCCH of the first carrier, to obtain the beam corresponding to the designated resource on the second carrier. Then, the terminal device may send the indication information to indicate the receiving state of the DCI to the network device. Then, the terminal device may determine, in a case that the SCS in the third resource information is less than the SCS in the second resource information, the first sub time and the second sub time in the designated time pacing according to the SCS in the second resource information and/or the SCS in the third resource information, and may determine the application time of the beam corresponding to the designated resource according to the sending time point of the indication information and the designated time gap. Therefore, the terminal device and the network device can maintain a consistent understanding for the application time of the cross-carrier beam, ensuring beam consistency, reducing an impact on communication transmission, and improving a performance of beam-based transmission.

In the above embodiments provided in the disclosure, the method provided in an embodiment of the disclosure is introduced from a perspective of a terminal device. In order to achieve various functions of the method provided in the above embodiment of the disclosure, the terminal device may include a hardware structure, a software module, and achieve the above functions in a form of the hardware structure, the software module, or a combination of hardware structure and software module. One of the above functions can be executed in the form of the hardware structure, the software module, or the combination of hardware structure and software module.

Figure 10:
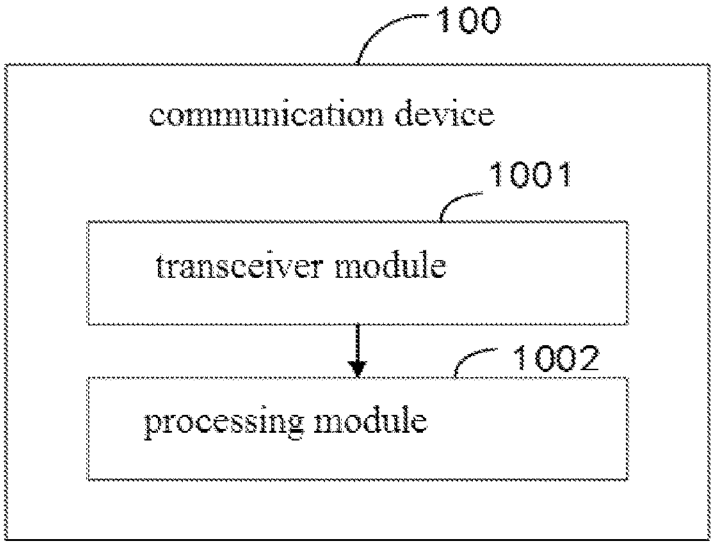
FIG. 10 is a block diagram illustrating a communication device according to an embodiment of the present disclosure.

Please referring to FIG. 10, FIG. 10 is a block diagram illustrating a communication device according to an embodiment of the present disclosure. A communication device 100 illustrated in the figured may include: a transceiver module 1001 and a processing module 1002.

The transceiver module 1001 may include a sending module and/or a receiving module. The sending module is configured to implement a sending function, the receiving module is configured to implement a receiving function, and the transceiver module 1001 may implement sending and/or receiving functions.

It can be understood that the communication device 100 can be a terminal device, a device in the terminal device, or a device that can be matched and used with the terminal device.

The communication device 100 includes:

the transceiver module 1001, configured to receive downlink control information (DCI) based on a physical downlink control channel (PDCCH) of a first carrier, in which, the DCI is configured to indicate a beam corresponding to a designated resource on a second carrier;

the transceiver module 1001 further configured to send indication information, in which, the indication information is configured to indicate a receiving state of the DCI; and the processing module 1002, configured to determine an application time of the beam corresponding to the designated resource according to a sending time point of the indication information.

Optionally, the designated resource includes at least one of a channel and a reference signal resource.

Optionally, the designated resource includes at least one of the following:

a PDCCH, a physical downlink shared channel (PDSCH), a physical uplink shared channel (PUSCH), a physical uplink control channel (PUCCH), a physical random access channel (PRACH), a physical broadcast channel (PBCH), a channel state information reference signal (CSI-RS), a sounding reference signal (SRS), a positioning reference signal (PRS), a tracking reference signal (TRS), and a synchronization signal block (SSB).

Optionally, the processing module is further configured to:

determine the designated resource according to at least one of the following:

a control resource set identifier;

a control resource set pool identifier;

an identifier of a semi-persistent PDSCH;

an identifier of a resource corresponding to a PUCCH;

an identifier of a configured grant free PUSCH;

a PRACH resource identifier;

an SSB index;

a reference signal resource identifier; and, a reference signal resource set identifier.

Optionally, the processing module 1002 is specifically configured to:

determine the application time of the beam corresponding to the designated resource according to the sending time point of the indication information and a designated time gap.

Optionally, the processing module 1002 is further configured to:

determine the designated time gap.

Optionally, the processing module 1002 is further specifically configured to:

in response to the DCI being further configured to indicate first resource information of a PDSCH and/or a PUSCH on the second carrier, and second resource information of a PUCCH for sending the indication information, determine the designated time gap according to at least one of the following: the first resource information, the second resource information, and third resource information of a PDCCH on the first carrier.

Optionally, the processing module 1002 is further specifically configured to:

determine the designated time gap according to a subcarrier spacing (SCS) in the first resource information and/or an SCS in the second resource information.

Optionally, the processing module 1002 is further specifically configured to:

in response to an SCS in the third resource information being greater than or equal to the SCS in the first resource information, determine the designated time gap according to the SCS in the first resource information;

and/or in response to the SCS in the third resource information being greater than or equal to the SCS in the first resource information, determine the designated time gap according to the SCS in the second resource information;

and/or in response to the SCS in the third resource information being greater than or equal to the SCS in the second resource information, determine the designated time gap according to the SCS in the first resource information;

and/or in response to the SCS in the third resource information being greater than or equal to the SCS in the second resource information, determine the designated time gap according to the SCS in the second resource information.

Optionally, the processing module 1002 is further specifically configured to:

determine a first sub time in the designated time gap according to an SCS in the first resource information and/or an SCS in the second resource information.

Optionally, the processing module 1002 is further specifically configured to:

in response to an SCS in the third resource information being less than the SCS in the first resource information, determine the first sub time in the designated time gap according to the SCS in the first resource information;

and/or in response to the SCS in the third resource information being less than the SCS in the first resource information, determine the first sub time in the designated time gap according to the SCS in the second resource information;

and/or in response to the SCS in the third resource information being less than the SCS in the second resource information, determine the first sub time in the designated time gap according to the SCS in the first resource information;

and/or in response to the SCS in the third resource information being less than the SCS in the second resource information, determine the first sub time in the designated time gap according to the SCS in the second resource information.

Optionally, the processing module 1002 is further specifically configured to:

determine a second sub time in the designated time gap.

Optionally, the processing module 1002 is further specifically configured to:

determine the second sub time in the designated time gap according to the SCS in the first resource information and/or an SCS in the third resource information;

and/or determine the second sub time in the designated time gap according to the SCS in the second resource information and/or an SCS in the third resource information.

Optionally, the second sub time is directly proportional to the SCS in the first resource information and inversely proportional to the SCS in the third resource information;

and/or, the second sub time is directly proportional to the SCS in the second resource information and inversely proportional to the SCS in the third resource information.

Optionally, the processing module 1002 is further specifically configured to:

in response to the DCI further being configured to indicate second resource information of a PUCCH for sending the indication information, determine the designated time gap according to the second resource information and/or third resource information of the PDCCH on the first carrier.

Optionally, the processing module 1002 is further specifically configured to:

in response to the SCS in the third resource information being greater than or equal to the SCS in the second resource information, determine the designated time gap according to the SCS in the second resource information and/or the SCS in the third resource information.

Optionally, the processing module 1002 is further specifically configured to:

in response to the SCS in the third resource information being less than the SCS in the second resource information, determine a first sub time in the designated time gap according to the SCS in the second resource information and/or the SCS in the third resource information.

Optionally, the processing module 1002 is further specifically configured to:

determine a second sub time in the designated time gap according to the SCS in the second resource information and the SCS in the third resource information.

Optionally, the second sub time is directly proportional to the SCS in the second resource information and inversely proportional to the SCS in the third resource information.

Optionally, the first carrier and the second carrier correspond to different serving cells of the terminal device respectively;

or, the first carrier corresponds to a serving cell of the terminal device, and the second carrier corresponds to a non-serving cell of the terminal device;

or, the first carrier corresponds to a non-serving cell of the terminal device, and the second carrier corresponds to a serving cell of the terminal device.

Functions and specific implementation principles of the above modules in embodiments of the present disclosure can be referred to in the above method embodiments, and will not be repeated herein.

According to the communication device provided in the present disclosure, the terminal device may receive the DCI based on the PDCCH of the first carrier, to obtain the beam corresponding to the designated resource on the second carrier. Then, the terminal device may send the indication information to indicate the receiving state of the DCI to a network device. Then, the terminal device may determine the application time of the beam corresponding to the designated resource according to the sending time point of the indication information. Therefore, the terminal device and the network device can maintain a consistent understanding for the application time of the cross-carrier beam, ensuring beam consistency, reducing an impact on communication transmission, and improving a performance of beam-based transmission.

Figure 11:
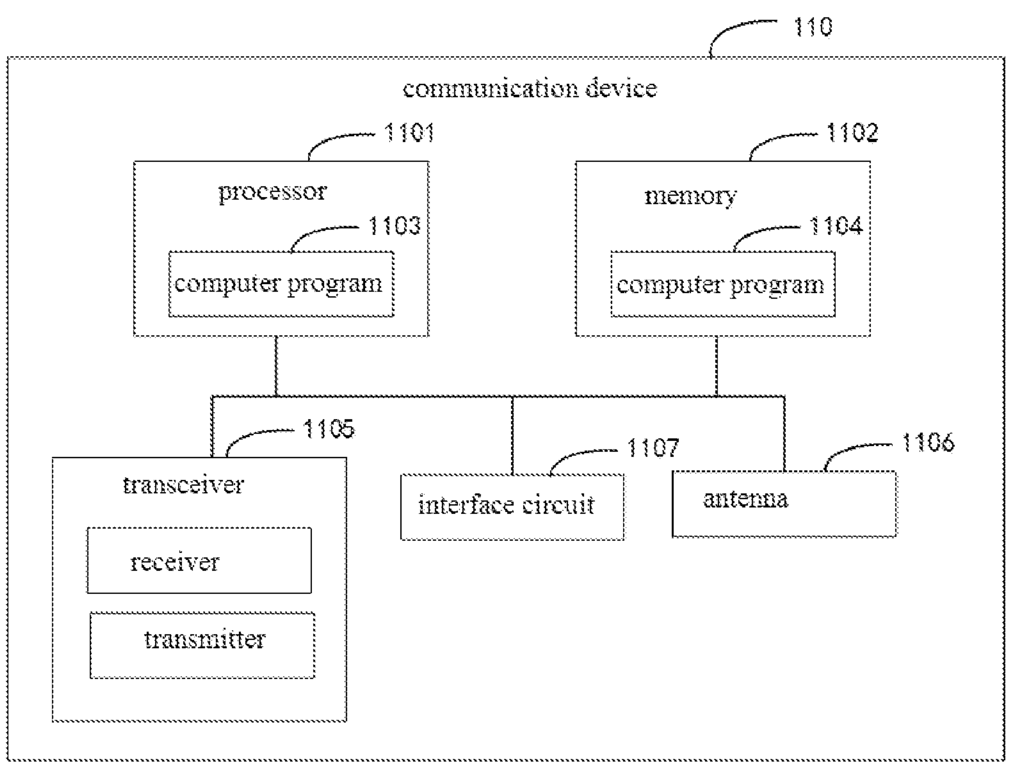
FIG. 11 is a block diagram illustrating a communication device according to another embodiment of the present disclosure.

Please referring to FIG. 11, FIG. 11 is a block diagram illustrating another communication device 110 provided in an embodiment of the present disclosure. The communication device 110 may be a terminal device, or a chip, a chip system, or a processor that supports a network device to implement the above method, or a chip, a chip system, or a processor that supports the terminal device to implement the above method. The device may be configured to implement the method as described in the above method embodiments, the details of which may refer to illustration of the above method embodiments.

The communication device 110 may include one or more processors 1101. The processor 1101 may be a general-purpose processor, a dedicated processor, or the like. For example, the processor 1101 may be a baseband processor or a central processing unit. The baseband processor may be configured to process a communication protocol and communication data, while the central processor may be configured to control the communication devices (such as a base station, a baseband chip, a terminal device, a terminal chip, a DU or a CU, etc.), execute a computer program, and process data from computer program.

Optionally, the communication device 110 may further include one or more memories 1102, each with a computer program 1104 stored thereon. The processor 1101 may execute the computer program 1104 to enable the communication device 110 to execute the method as described in the above method embodiments.

Optionally, the memory 1102 may further store data. The communication device 110 and the memory 1102 may be set separately or integrated together.

Optionally, the communication device 110 may further include a transceiver 1105 and an antenna 1106. The transceiver 1105 may be referred to as a transceiver unit, transceiver, or transceiver circuit, etc., configured to achieve a transceiver function. The transceiver 1105 may include a receiver and a transmitter, and the receiver may be referred to as a receiver or a reception circuit, etc., configured to achieve a reception function; the transmitters may be referred to as a transmitter or a transmission circuit, etc., configured to achieve a transmission function.

Optionally, the communication device 110 may also include one or more interface circuits 1107. The interface circuit 1107 is configured to receive code instructions and transmit the code instructions to the processor 1101. The processor 1101 runs the code instructions causing the communication device 110 to execute the method as described in the above method embodiment.

The communication device 110 is a terminal device. The transceiver 1105 is configured to perform the block 21 in FIG. 2; the block 22 in FIG. 2; the block 31 in FIG. 3; the block 32 in FIG. 3; the block 41 in FIG. 4; the block 42 in FIG. 4; the block 51 in FIG. 5; the block 52 in FIG. 5; the block 61 in FIG. 6; the block 62 in FIG. 6; the block 71 in FIG. 7; the block 72 in FIG. 7; the block 81 in FIG. 8; the block 82 in FIG. 8; the block 91 in FIG. 9; or the block 92 in FIG. 9. The processor 1101 is configured to perform the block 23 in FIG. 2; the block 33 in FIG. 3; the block 43 in FIG. 4; the block 44 in FIG. 4; the block 53 in FIG. 5; the block 54 in FIG. 5; the block 63 in FIG. 6; the block 64 in FIG. 6; the block 65 in FIG. 6; the block 73 in FIG. 7; the block 74 in FIG. 7; the block 83 in FIG. 8; the block 84 in FIG. 8; the block 93 in FIG. 9; the block 94 in FIG. 9; or the block 95 in FIG. 9.

In an implementation, processor 1101 may include a transceiver for implementing reception and transmission functions. For example, the transceiver may be a transceiver circuit, an interface, or an interface circuit. The transceiver circuit, the interface, or the interface circuit for achieving the reception and transmission functions may be separate or integrated together. The above-mentioned transceiver circuit, interface or interface circuit may be configured for reading and writing codes/data, or the aforementioned transceiver circuit, interface or interface circuit may be configured for transmitting or transferring of signals.

In an implementation, the processor 1101 may store a computer program 1103. The computer program 1103 may cause communication device 110 to execute the method described in the above method embodiment when running on the processor 1101. The computer program 1103 may be embedded in the processor 1101, in which case the processor 1101 may be implemented by hardware.

In an implementation, the communication device 110 may include a circuit that may achieve functions of sending, receiving, or communicating in the aforementioned method embodiments. The processor and the transceiver described in the present disclosure may be implemented on an integrated circuit (IC), an analog IC, a radio frequency integrated circuit (RFIC), a mixed signal IC, an application specific integrated circuits (ASIC), a printed circuit boards (PCB), an electronic device, and the like. The processor and the transceiver may also be manufactured using various IC process technologies, such as complementary metal oxide semiconductor (CMOS), N-type metal oxide semiconductor (NMOS), P-type metal oxide semiconductor (PMOS), bipolar junction transistor (BJT), bipolar CMOS (BiCMOS), silicon germanium (SiGe), gallium arsenide (GaAs), etc.

The communication device described in the above embodiments may be a network device or a terminal device (such as the first terminal device in the aforementioned method embodiment), but the scope of the communication device described in the present disclosure is not limited to this, and the structure of the communication device may not be limited by FIG. 11. The communication device can be an independent device or can be part of a larger device. For example, the communication device may be:

(1) an independent integrated circuit IC, or a chip, or a chip system or subsystem;

(2) a set of one or more ICs, optionally including a storage element for storing data and the computer program;

(3) an ASIC, such as a modem;

(4) modules that can be embedded in other devices;

(5) a receiver, a terminal, a smart terminal, a cellular phone, a wireless device, a handheld device, a mobile unit, an on-board device, a network device, a cloud device, an artificial intelligence device, etc.;

(6) others and the like.

Figure 12:
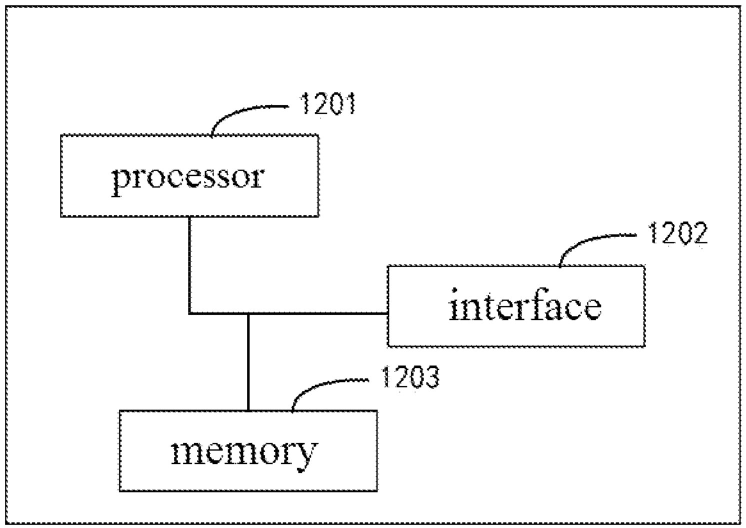
FIG. 12 is a block diagram illustrating a chip according to an embodiment of the present disclosure.

For a case that the communication device is the chip or the chip system, please refer to a schematic diagram of a structure of the chip shown in FIG. 12. The chip illustrated in FIG. 12 includes a processor 1201 and an interface 1202. A number of processors 1201 may be one or more, and a number of interfaces 1202 may be more than one.

For a case where the chip is configured to implement functions of the terminal device in embodiments of the present disclosure:

the interface 1202 is configured to execute block 21 in FIG. 2; block 22 in FIG. 2; block 31 in FIG. 3; block 32 in FIG. 3; block 41 in FIG. 4; block 42 in FIG. 4; block 51 in FIG. 5; block 52 in FIG. 5; block 61 in FIG. 6; block 62 in FIG. 6; block 71 in FIG. 7; block 72 in FIG. 7; block 81 in FIG. 8; block 82 in FIG. 8; block 91 in FIG. 9; or block 92 in FIG. 9.

Optionally, the chip may further include a memory 1203. The memory 1203 is configured to store a necessary computer program and data.

Those skilled in the art may also understand that various illustrative logical blocks and steps listed in embodiments of the present disclosure can be implemented through electronic hardware, computer software, or a combination thereof. Whether such functions are implemented through hardware or software depends on a specific application and design requirements of an overall system. Those skilled in the art may use various methods to implement functions for each specific application, but such implementation should not be understood as beyond the scope of protection of embodiments of the present disclosure.

An embodiment of the present disclosure also provides a system for determining an application time of an across-carrier beam. The system includes a communication device as a terminal device in the aforementioned embodiment of FIG. 10, or a communication device as a terminal device in the aforementioned embodiment of FIG. 11.

The present disclosure also provides a computer-readable storage medium with instructions stored thereon. The instructions are configured to implement functions of any of the above method embodiments when executed by a computer.

The present disclosure also provides a computer program product, configured to implement functions of any of the above method embodiments when executed by a computer.

All or part of the above embodiments can be implemented through software, hardware, firmware, or any combination thereof. When implemented using the software, all or part of the above embodiments can be implemented in the form of computer program product. The computer program product includes one or more computer programs. When loading and executing the computer programs on a computer, the computer programs may be generated all or part of processes or functions according to embodiments of the present disclosure. The computer can be a general-purpose computer, a specialized computer, a computer network, or other programmable devices. The computer programs can be stored on a computer-readable storage media or transmitted from one computer readable storage medium to another, for example, the computer programs can be transmitted from a website site, a computer, a server or a data center to another website site, computer, server, or data center through wired (such as coaxial cable, fiber optic, digital subscriber line (DSL)) or wireless (such as infrared, wireless, microwave, etc.) methods. The computer-readable storage medium can be any available medium that a computer can access, or a data storage device such as a server including one or more available media integrations or a data center. The available media can be a magnetic media (such as a floppy disk, a hard drive, a magnetic tape), an optical media (such as a high-density digital video disc (DVD)), or a semiconductor media (such as a solid state disk (SSD)), etc.

Those ordinary skilled in the art may understand that first, second, and other numerical numbers involved in the disclosure are distinguished only for convenience of description, and are not intended to limit the scope of embodiments of the present disclosure, nor indicate an order.

At least one in this disclosure can also be described as one or more, and a plurality can be two, three, four, or more, without limitation in this disclosure. In embodiments of the present disclosure, for one type of technical feature, technical features in the type of technical feature are distinguished by "first", "second", "third", "A", "B", "C", and "D". The technical features described by "first", "second", "third", "A", "B", "C", and "D" are without any order or sequence.

Correspondences shown in respective tables in the present disclosure can be configured or predefined. The values of information in each table are only examples and can be configured as other values, which will not be limited in the present disclosure. When configuring the correspondence between information and various parameters, it is not necessary to configure all the correspondence shown in each table. For example, in the table in the present disclosure, the correspondences shown in certain rows may not be configured. For example, an appropriate deformation adjustment can be made based on the above table, such as splitting, merging, etc. Names of parameters shown in a title of the above table can also use other names that can be understood by the communication device, and the values or representations of the parameters can also use other values or representations that can be understood by the communication device. When implementing the above tables, other data structures can also be used, such as an array, a queue, a container, a stack, a linear table, a pointer, a linked list, a tree, a graph, a structure, a class, a heap, a hash table, or a hash table.

The term predetermined in this disclosure can be understood as defined, predefined, stored, prestored, prenegotiated, preconfigured, cured, or prefired.

Those ordinary skilled in the art can realize that a unit and an algorithm step of each example described in combination with embodiments in the present disclosure can be implemented in electronic hardware, or a combination of computer software and the electronic hardware. Whether such functions are executed in hardware or software depends on specific applications and design constraints of the technical solution. Those skilled may use different methods to implement the described functions for each specific application, but such implementation should not be considered beyond the scope of this disclosure.

Those skilled in the art can clearly understand that for convenience and conciseness of description, specific working processes of the system, device, and unit described above can refer to the corresponding processes in the aforementioned method embodiments, and will not be repeated here.

The above description is only a specific implementation of the disclosure, but the scope of protection of the disclosure is not limited to this. Any changes or replacements that can easily be imagined by any skilled person familiar with the technical field within the scope of the disclosure should be covered within the scope of protection of the disclosure. Therefore, the scope of protection of the disclosure should be based on the scope of protection of claims.

The invention claimed is:

1. A method for determining an application time of a beam, performed by a terminal device, comprising:

receiving downlink control information (DCI) based on a physical downlink control channel (PDCCH) of a first carrier, wherein the DCI is configured to indicate a beam corresponding to a designated resource on a second carrier;

sending indication information, wherein the indication information is configured to indicate a receiving state of the DCI; and determining an application time of the beam corresponding to the designated resource according to a sending time point of the indication information;

wherein determining the application time of the beam corresponding to the designated resource according to the sending time point of the indication information comprises:

determining the application time of the beam corresponding to the designated resource according to the sending time point of the indication information and a designated time gap;

wherein the method further comprises:

determining the designated time gap according to at least one of: first resource information, second resource information, or third resource information of a PDCCH on the first carrier, wherein the DCI is further configured to indicate the first resource information of at least one of a physical downlink shared channel (PDSCH) or a physical uplink shared channel (PUSCH) on the second carrier and the second resource information of a physical uplink control channel (PUCCH) for sending the indication information;

wherein determining the designated time gap according to at least one of: the first resource information, the second resource information, or the third resource information of the PDCCH on the first carrier comprises at least one of:

determining the designated time gap according to a sub-carrier spacing (SCS) of the first resource information, wherein an SCS of the third resource information is greater than or equal to the SCS of the first resource information;

determining the designated time gap according to an SCS of the second resource information, wherein an SCS of the third resource information is greater than or equal to the SCS of the second resource information;

determining the designated time gap according to an SCS of the second resource information, wherein an SCS of the third resource information is greater than or equal to an SCS of the first resource information; or determining the designated time gap according to an SCS of the first resource information, wherein an SCS of the third resource information is greater than or equal to an SCS of the second resource information.

2. The method according to claim 1, wherein the designated resource comprises at least one of a channel or a reference signal resource.

3. The method according to claim 2, wherein the designated resource comprises at least one of:

a PDCCH, a PDSCH, a PUSCH, a PUCCH, a physical random access channel (PRACH), a physical broadcast channel (PBCH), a channel state information reference signal (CSI-RS), a sounding reference signal (SRS), a positioning reference signal (PRS), a tracking reference signal (TRS), or a synchronization signal block (SSB).

4. The method according to claim 3, further comprising:

determining the designated resource according to at least one of:

a control resource set identifier;

a control resource set pool identifier;

an identifier of a semi-persistent PDSCH;

an identifier of a resource corresponding to a PUCCH;

an identifier of a configured grant free PUSCH;

a PRACH resource identifier;

an SSB index;

a reference signal resource identifier; or a reference signal resource set identifier.

5. The method according to claim 1, wherein determining the designated time gap according to at least one of: the first resource information, the second resource information, or third resource information of a PDCCH on the first carrier further comprises:

determining a first sub time in the designated time gap according to at least one of the SCS of the first resource information or the SCS of the second resource information.

6. The method according to claim 5, wherein determining the first sub time in the designated time gap according to at least one of the SCS of the first resource information or the SCS of the second resource information comprises at least one of:

determining the first sub time in the designated time gap according to the SCS of the first resource information, wherein the SCS of the third resource information is less than the SCS of the first resource information;

determining the first sub time in the designated time gap according to the SCS of the second resource information, wherein the SCS of the third resource information is less than the SCS of the first resource information;

determining the first sub time in the designated time gap according to the SCS of the first resource information, wherein the SCS of the third resource information is less than the SCS of the second resource information; or determining the first sub time in the designated time gap according to the SCS of the second resource information, wherein the SCS of the third resource information is less than the SCS of the second resource information.

7. The method according to claim 5, further comprising: determining a second sub time in the designated time gap.

8. The method according to claim 7, wherein determining the second sub time in the designated time gap comprises at least one of:

determining the second sub time in the designated time gap according to at least one of the SCS of the first resource information or the SCS of the third resource information; or determining the second sub time in the designated time gap according to at least one of the SCS of the second resource information or the SCS of the third resource information.

9. The method according to claim 8, wherein, the second sub time is directly proportional to the SCS of the first resource information and inversely proportional to the SCS of the third resource information;

the second sub time is directly proportional to the SCS of the second resource information and inversely proportional to the SCS of the third resource information; or the second sub time is directly proportional to the SCS of the first resource information and the SCS of the second resource information, and inversely proportional to the SCS of the third resource information.

10. The method according to claim 1, wherein determining the designated time gap further comprises at least one of:

determining the designated time gap according to at least one of the second resource information or third resource information of the PDCCH on the first carrier, wherein the DCI is further configured to indicate second resource information of a PUCCH for sending the indication information.

11. The method according to claim 10, wherein determining the designated time gap according to at least one of the second resource information or the third resource information of the PDCCH on the first carrier comprises at least one of:

determining the designated time gap according to at least one of the SCS of the second resource information or the SCS of the third resource information, wherein the SCS of the third resource information is greater than or equal to the SCS of the second resource information; or determining a first sub time in the designated time gap according to at least one of the SCS of the second resource information or the SCS of the third resource information, wherein the SCS of the third resource information is less than the SCS of the second resource information.

12. The method according to claim 11, further comprising:

determining a second sub time in the designated time gap according to the SCS of the second resource information and the SCS of the third resource information.

13. The method according to claim 12, wherein, the second sub time is directly proportional to the SCS of the second resource information and inversely proportional to the SCS of the third resource information.

14. The method according to claim 1, wherein, the first carrier and the second carrier correspond to different serving cells of the terminal device respectively;

the first carrier corresponds to a serving cell of the terminal device, and the second carrier corresponds to a non-serving cell of the terminal device; or the first carrier corresponds to a non-serving cell of the terminal device, and the second carrier corresponds to a serving cell of the terminal device.

15. A communication device, comprising:

a processor; and a memory storing a computer program executable by the processor, wherein the processor is configured to:

receive downlink control information (DCI) based on a physical downlink control channel (PDCCH) of a first carrier, wherein the DCI is configured to indicate a beam corresponding to a designated resource on a second carrier;

send indication information, wherein the indication information is configured to indicate a receiving state of the DCI; and determine an application time of the beam corresponding to the designated resource according to a sending time point of the indication information;

wherein the processor is configured to:

determine the application time of the beam corresponding to the designated resource according to the sending time point of the indication information and a designated time gap;

wherein the processor is further configured to:

determine the designated time gap according to at least one of: first resource information, second resource information, or third resource information of a PDCCH on the first carrier, wherein the DCI is further configured to indicate the first resource information of at least one of a physical downlink shared channel (PDSCH) or a physical uplink shared channel (PUSCH) on the second carrier and the second resource information of a physical uplink control channel (PUCCH) for sending the indication information;

wherein the processor is further configured to perform at least one of:

determining the designated time gap according to a sub-carrier spacing (SCS) of the first resource information, wherein an SCS of the third resource information is greater than or equal to the SCS of the first resource information;

determining the designated time gap according to an SCS of the second resource information, wherein an SCS of the third resource information is greater than or equal to the SCS of the second resource information;

determining the designated time gap according to an SCS of the second resource information, wherein an SCS of the third resource information is greater than or equal to an SCS of the first resource information; or determining the designated time gap according to an SCS of the first resource information, wherein an SCS of the third resource information is greater than or equal to an SCS of the second resource information.

16. A non-transitory computer-readable storage medium having stored thereon instructions that, when executed by a processor of a terminal device, cause the terminal device to perform a method for determining an application time of a beam, the method comprising:

receiving downlink control information (DCI) based on a physical downlink control channel (PDCCH) of a first carrier, wherein the DCI is configured to indicate a beam corresponding to a designated resource on a second carrier;

sending indication information, wherein the indication information is configured to indicate a receiving state of the DCI; and determining an application time of the beam corresponding to the designated resource according to a sending time point of the indication information;

wherein determining the application time of the beam corresponding to the designated resource according to the sending time point of the indication information comprises:

determining the application time of the beam corresponding to the designated resource according to the sending time point of the indication information and a designated time gap;

wherein the method further comprises:

determining the designated time gap according to at least one of: first resource information, second resource information, or third resource information of a PDCCH on the first carrier, wherein the DCI is further configured to indicate the first resource information of at least one of a physical downlink shared channel (PDSCH) or a physical uplink shared channel (PUSCH) on the second carrier and the second resource information of a physical uplink control channel (PUCCH) for sending the indication information;

wherein determining the designated time gap according to at least one of: the first resource information, the second resource information, or the third resource information of the PDCCH on the first carrier comprises at least one of:

determining the designated time gap according to a sub-carrier spacing (SCS) of the first resource information, wherein an SCS of the third resource information is greater than or equal to the SCS of the first resource information;

determining the designated time gap according to an SCS of the second resource information, wherein an SCS of the third resource information is greater than or equal to the SCS of the second resource information;

determining the designated time gap according to an SCS of the second resource information, wherein an SCS of the third resource information is greater than or equal to an SCS of the first resource information; or determining the designated time gap according to an SCS of the first resource information, wherein an SCS of the third resource information is greater than or equal to an SCS of the second resource information.

* * * * *